United States Patent [19]

Ohta

[11] Patent Number: 4,639,190
[45] Date of Patent: Jan. 27, 1987

[54] TUBULAR WATER WHEEL
[75] Inventor: Jiro Ohta, Hitachi, Japan
[73] Assignee: Hitachi, Ltd., Tokyo, Japan
[21] Appl. No.: 734,121
[22] Filed: May 15, 1985

[30] Foreign Application Priority Data

May 16, 1984 [JP] Japan .................................. 59-98388

[51] Int. Cl.⁴ ...................... F01D 15/10; F03B 3/06; F03B 3/14
[52] U.S. Cl. .................................... 415/129; 416/162; 416/168 A
[58] Field of Search ............... 415/DIG. 10, 129, 130, 415/33, 48; 416/162, 168 A, 159, 164, 166

[56] References Cited

U.S. PATENT DOCUMENTS

| | | | |
|---|---|---|---|
| 1,837,568 | 12/1931 | Moody | 415/129 X |
| 1,853,139 | 4/1932 | Moody | 410/159 |
| 1,962,383 | 6/1934 | Biggs | 415/129 |
| 2,379,839 | 7/1945 | Stepanoff | 415/129 X |
| 3,785,747 | 1/1974 | Mayo | 415/129 X |
| 3,932,054 | 1/1976 | McKelvey | 415/130 |
| 4,362,463 | 12/1982 | Sudo et al. | 416/162 X |

FOREIGN PATENT DOCUMENTS

| | | | |
|---|---|---|---|
| 557801 | 6/1957 | Belgium | 416/159 |
| 5844 | 2/1970 | Japan | 415/142 |
| 5459 | 1/1980 | Japan | 415/130 |
| 94066 | 4/1959 | Norway | 416/162 |
| 188181 | 3/1964 | Sweden | 416/159 |
| 567850 | 8/1977 | U.S.S.R. | 415/130 |

Primary Examiner—Everette A. Powell, Jr.
Attorney, Agent, or Firm—Beall Law Offices

[57] ABSTRACT

An operating rod is connected at its one end to a runner vane rotary shaft through a link and lever mechanism. The operating rod is supported by a rotational propelling force bearing. The rotational propelling force bearing is reciprocatingly moved through a link and lever mechanism by a servomotor disposed outside of a stay ring. With such a construction, the rotational operation of the runner vanes may be smoothly attained.

7 Claims, 4 Drawing Figures

TUBULAR WATER WHEEL

BACKGROUND OF THE INVENTION

The present invention relates to a tubular water wheel and, more particularly, to a tubular water wheel with a device for actuating runner vanes thereof being arranged outside of the water wheel.

A tubular water wheel may be operated with a high efficiency over a wide operational range by controlling an angle of the runner vanes thereof in accordance with its operational condition. A hydraulic pressure is generally used as a power source for the runner vanes.

Accordingly, in order to actuate the runner vanes to change their operational angle, a hydraulic pressure is applied through a water wheel main shaft to a servomotor disposed in a runner boss by means of a hydraulic pressure feeder arranged within stay vanes. As a result, the runner vanes which are rotatably mounted on the runner boss are actuated through a link connected to the servomotor.

In the thus constructed tubular water wheel, the space in the runner boss is large, which is suitable for a large capacity machine having an output of several ten thousands of kilo watts. However, in case of a small capacity machine having an output of several hundreds of kilo watts, the space in the runner boss is small. Therefore, in this case, it is impossible to use a built-in type servomotor and hence a tubular water wheel as disclosed in, for example, the Japanese Patent Publication No. 58-4238 is available in which its runner vane actuator is disposed outside of the water vane.

FIGS. 3 and 4 show the tubular water wheel with an actuator for operating runner vanes being arranged outside of the tubular water. The tubular water wheel includes a draft tube 1, stay vanes 2, a stay ring 3, a wheel inner case 4, guide vanes 5 for adjusting and guiding the flow of water, a water wheel main shaft 6, a guide bearing 7 for the water wheel main shaft 6, a runner boss 8, runner vanes 9, an operating rod 10 for the runner vanes 9, a cross head 11, a link 12, a lever 13, a runner vane rotary shaft 14, a rotary disc 15 loosely engaged with the operating rod 10, a spiral fixed member 16 for forming (together with a part of the water wheel inner case 4) a spiral engagement groove 17 engaged with the rotary disc 15, an operating rod 18 one end of which is rotatably mounted on a pin 19 implanted in the rotary disc 15 and the other end of which is rotatably mounted at one end of a lever 21 rotatably mounted about a pin 20 outside of the tubular passage, and a servomotor 22 for applying its operating power to the other end of the lever 21.

With the thus constructed tubular water wheel, pressurized water fed through the stay ring 3 is applied through the guide vanes 5 to the runner vanes 9 and is discharged through the draft tube 1 to the downstream side, whereupon the runner vanes 9 are rotated to actuate an electric generator (not shown) directly coupled to the water wheel main shaft 6, thereby generating an electric power. When the servomotor 22 is actuated to allow the rotary disc 15 to be rotated through the operating rod 18, the rotary disc 15 may be reciprocatingly moved rightward and leftward as shown by the phanton line in FIG. 3 because the rotary disc 15 is engaged with the spiral engagement groove 17. As a result, the operating rod 10 is also reciprocated right and left whereby the angle of the runner vanes 9 mounted rotatably on the runner boss 8 through the cross head 11, the link 12 and the lever 13 may be adjusted to any desired angle.

However, in order to change and keep the angle of the runner vanes 9 of such a tubular water wheel, a large force is required. Even in case of the smaller capacity machine having an output power of several kilo watts, since an operating force of several tens of tons is applied to the rotary disc 15 and the operating rod 10, a frictional loss would become marked. More specifically, in such a tubular water wheel, the up and down motion of the operating rod 18 must be converted into the right and left reciprocating motion by means of the spiral engagemnet groove 17, and there must be provided a coupling structure subjected to the propelling force of the operating rod 10 to be rotated together with the runner vanes 9 and the runner boss 8 and to be reciprocatingly moved right and left together with the rotary disc 15. Thus, the two bearing portions are needed for being subjected to the operating propelling force and rotation of the operating rod 10. Therefore, large frictional losses would be generated in the respective sliding parts due to such a complicated mechanism for converting the up and down motion of the operating rod 18 through the spiral engagement groove 17 into the right and left reciprocating motion, and the spiral engagement groove portion would be damaged due to its scratching or a seizing phenomenon. The complicated mechanism is difficult to assemble and disassemble. Because the two bearing portions are subjected to the operating propelling force and rotation and the guide bearings for the water wheel main shaft are separately provided, a problem will be encountered that the oil feeding portions must be separately provided for the various bearing portions.

SUMMARY OF THE INVENTION

In order to overcome the above-noted defects, an object of the present invention is to provide a tubular water wheel having a high reliability and including a runner vane operating mechanism which is superior in operation.

In accordance with one aspect of the present invention, in a tubular water wheel comprising a water wheel inner case having movable portions such as a runner, the water wheel inner case being incorporated in a stay ring through stay vanes, an operating rod reciprocatingly moved by an operating means including a servomotor provided outside of the stay vanes, the operating means passing through the stay vanes, and an operating mechanism interposed between the operating rod and a rotary shaft of the runner vanes for transmitting the reciprocating motion of the connecting rod to rotate the rotary shaft of the runner vanes, the tubular water wheel is characterized in that the operating rod has a propelling force receiving plate at its end on the operating means side, and the propelling force receiving plate is provided at a bearing retaining portion reciprocatingly moving within a bearing support portion provided upstream of the water wheel inner case.

In accordance with another aspect of the present invention, the water wheel main shaft is rotatably supported by a water wheel main shaft guiding bearing of the bearing support portion provided upstream of the water wheel inner case and has the propelling force receiving plate at its end on the runner vane side, and the propelling force receiving plate is rotatably supported by a rotational propelling force bearing provided at the bearing support portion for reciprocatingly moving within the bearing support portion provided within the water wheel main shaft.

Namely, for example, in accordance with the present invention, a rotational propelling force bearing is interposed between an end of the operating rod and a cross head connected through a link and a lever to the runner vane rotary shaft or a lever and a link movably connected through the stay vane interior to a servomotor disposed outside of the stay ring. The reciprocating motion of the servomotor is directly transmitted by the lever and the link, thereby reciprocatingly moving the operating rod right and left. With such a construction, it is possible to provide a tubular water wheel having a runner vane operating mechanism of small capacity which may be assembled and disassembled easily and which has a high reliability without a substantial frictional loss.

DESCRIPTION OF THE PREFERRED EMBODIMENTS

Figure 3:
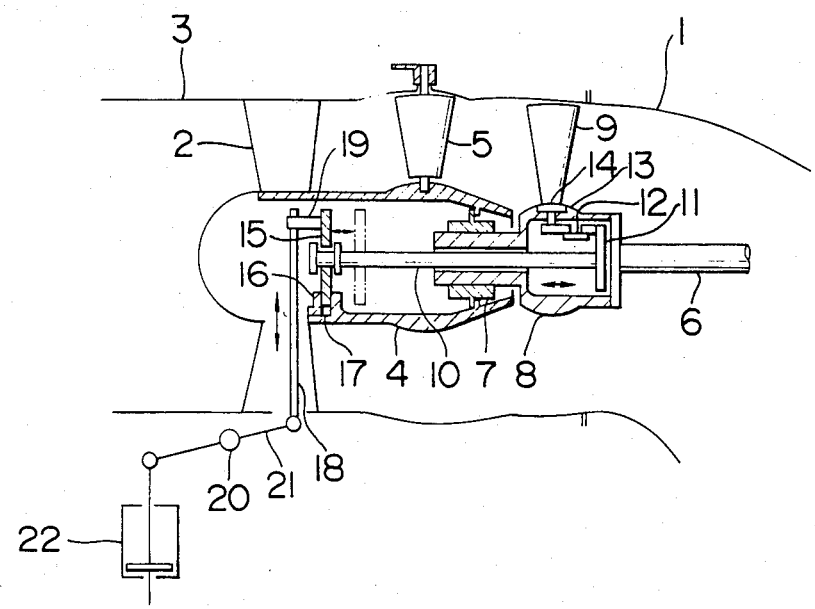
FIG. 3 is a view showing an example of a conventional tubular water wheel.
Figure 4:
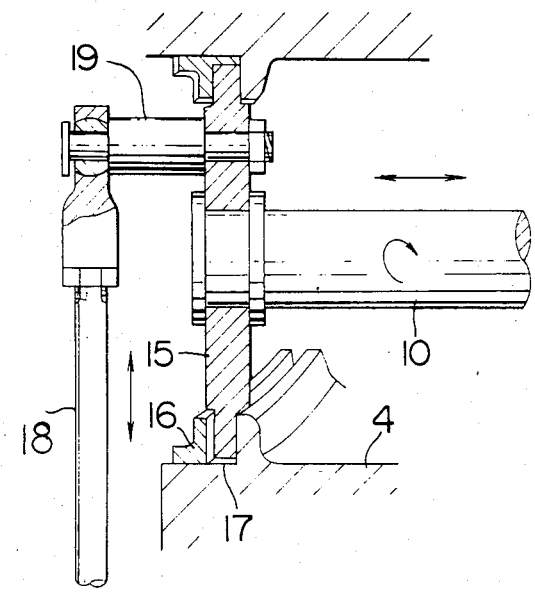
FIG. 4 is a view illustrating a primary part of the tubular water wheel shown in FIG. 3.

One embodiment of the invention will now be described with reference to FIG. 1, in which the same reference characters are used to designate the like or same components or members as in FIGS. 3 and 4. The explanations of the same components will be omitted and the different components and members will be explained.

A bearing support portion 31 is provided upstream of a water wheel inner case 4. A water wheel main shaft guiding bearing 32 is provided in the bearing support portion 31. An operating rod 33 passes through a water wheel main shaft portion 6A to be reciprocable in the axial direction but not rotatable. The operating rod 33 is provided at one end with a cross head 11 and at the other end with a propelling force receiving plate 34. A rotational propelling force bearing 35 rotatably supports the propelling force receiving plate 34. A bearing retaining portion 36 retaining the rotational propelling force bearing 35 is held by a slide bearing 37 so that the retaining portion 36 may be reciprocatingly moved along an inner periphery of the bearing support portion 31. A lever 38 is pivotally supported to the water wheel inner case 4 by a pin 39. The lever 38 is pivotally connected at one end to a servomotor 22 and at the other end to the bearing retaining portion 36 through a link 40.

In the thus constructed tubular water wheel, the cross head 11 is provided on the runner side of the operating rod 33 whereas the propelling force receiving plate 34 is provided on the other side thereof. The bearing support portion 31 is constituted by a metal case mounted coaxially with the stay ring 3. The bearing retaining portion 36 is held to be operatively reciprocable in the axial direction and is made of a metal case provided on both sides with the rotational propelling force bearings 35 so that the bearing retaining portion 36 may be moved in response to the operating propelling force in both right and left directions. The runner side portion of the bearing retaining portion 36 is close to the water wheel main shaft guiding bearing 32. Thus, the bearing retaining poprtion 36 is formed in unison with the water wheel bearing.

In the tubular water wheel, the components rotated together with the water wheel main shaft 6 are the runner vanes 9, the runner boss 8, the lever (not shown), the link 12, the cross head 11, the operating rod 33 and the propelling force receiving plate 34. In particular, the cross head 11, the operating rod 33 and the propelling force receiving plate 34 are reciprocatingly moved while rotating. The bearing retaining portion 36 is not rotated but reciprocatingly moved.

Accordingly, in the tubular water wheel, if the position of the bearing retaining portion 36 is determined, the propelling force receiving plate 34 is located at a determined position, and the angle of the runner vanes 9 is set by the cross head 11. Under such a condition, the water wheel main shaft 6A is rotated while being supported by the water wheel main shaft guiding bearing 32. In the case where the angle of the rotating runner vanes 9, set at a predetermined angle, is desired to be changed, the actuation of the servomotor 22 allows the lever 38 to move to, for example, the position indicated by the broken lines in FIG. 1. As a result, the other end of the lever 38 is moved so that the propelling force receiving plate 34 is moved to the runner vane 9 side under the rotated condition for moving the bearing retaining portion 36 within the bearing support portion 31. Thus, the runner vane angle may be changed through the cross head 11, the link 12, and the lever (not shown).

In the thus constructed tubular water wheel, the single bearing portion is provided for simultaneously being subjected to the runner vane operating propelling force and rotation. Therefore, it is possible to reduce the frictional loss to about half the frictional loss that would be generated in the water wheel with a plurality of different bearing portions. As a result, this makes it possible to reduce the capacity of the servomotor and to enhance the reliability. Also, a bearing portion is connected to the single location so that it is possible to simplify the oil feeding work and to facilitate the assembling and disassembling work. Thus, it is possible to provide the structure suitable for the small capacity tubular water wheel.

Figure 1:
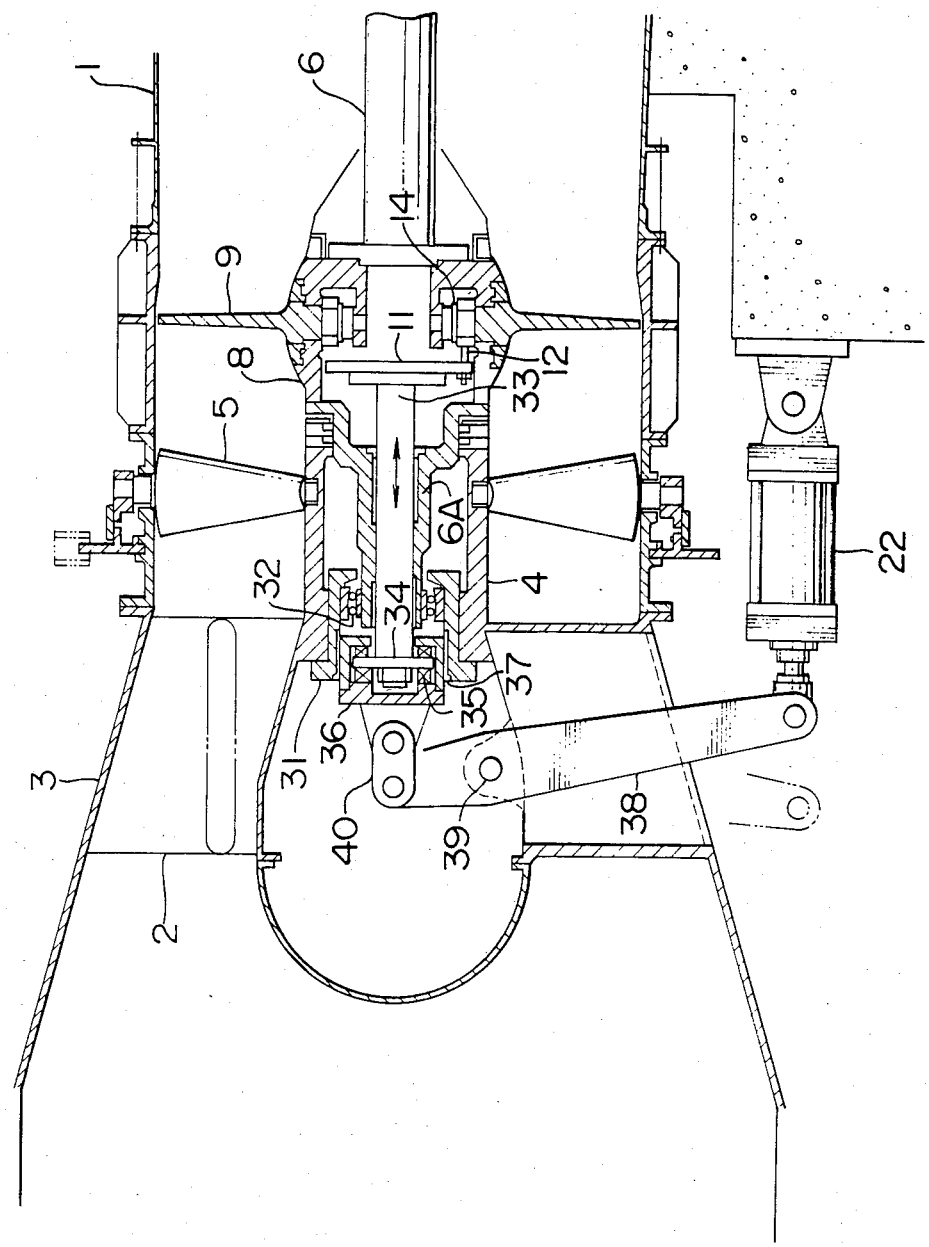
FIG. 1 is a longitudinal sectional view showing one embodiment of a tubular water wheel in accordance with the present invention.
Figure 2:
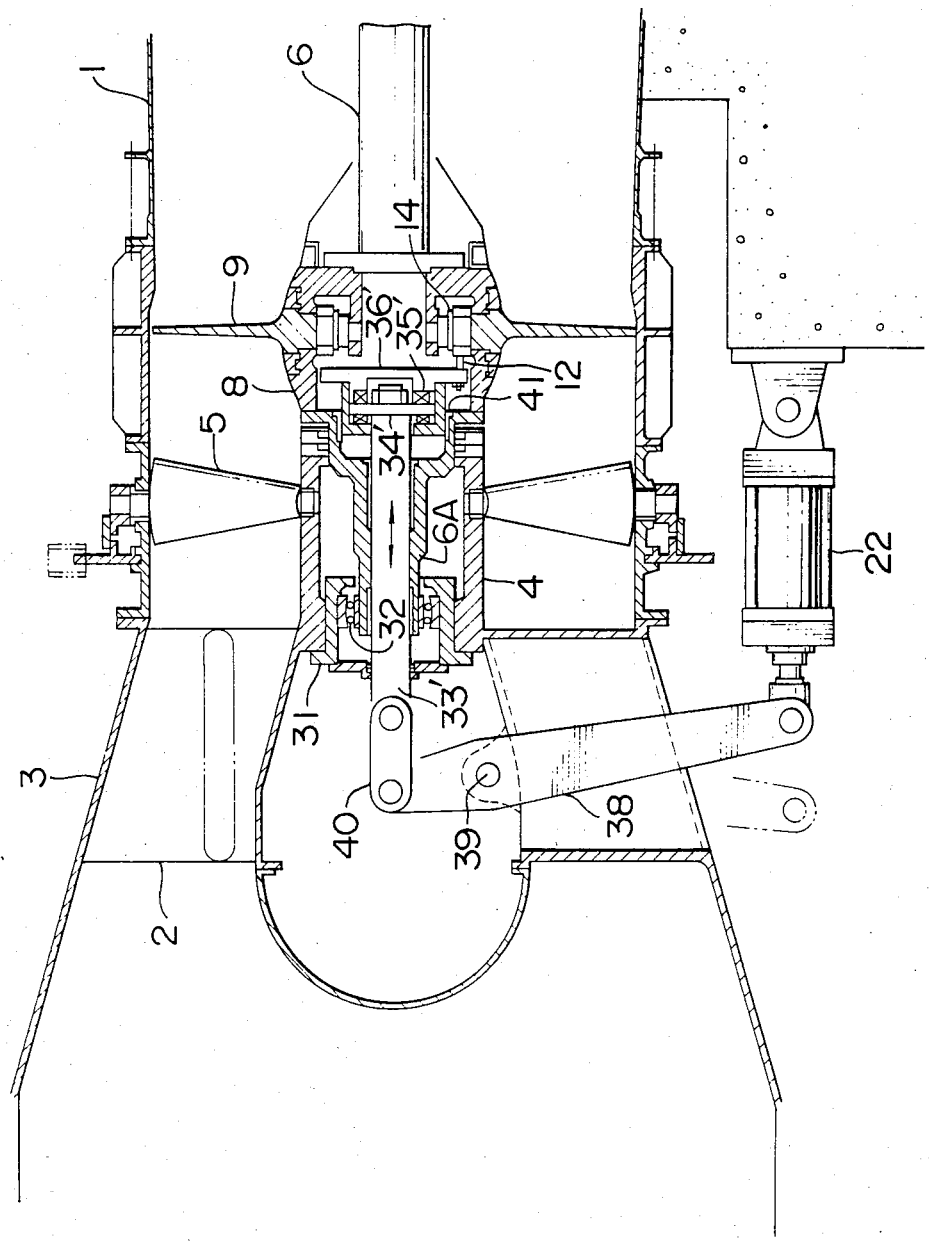
FIG. 2 is a longitudinal sectional view showing another embodiment of a tubular water wheel in accordance with the present invention.

FIG. 2 shows another embodiment of the present invention in which the same reference characters are used to designate the same or like components as in FIG. 1. A feature which is different from that of the foregoing embodiment is the position where the propelling force receiving plate is mounted on the operating rod. As is apparent from the comparison of the embodiment shown in FIG. 2 with that shown in FIG. 1, the propelling force bearing or receiving plate is provided at an end on the cross head side of the operating rod. Incidentally, in FIG. 2, although the same or like members or components are indicated by the same reference characters used in FIG. 1, the components which are desired to be distinguished from those shown in FIG. 1 are indicated with primes.

More specifically, an operating rod 33' is engaged at the upstream side with a link 40, and a propelling force receiving plate 34' is provided on the downstream side. The propelling force receiving plate 34' is rotatably supported by a rotational propelling force bearing 35' supported in a bearing retaining portion 36'. The bearing retaining portion 36' is reciprocatingly movable within a bearing support portion 41 provided within the water wheel main shaft 6A. At the same time, the bearing retaining portion 36' is engaged at its outside with the runner vane rotary shaft 14 through the link 12 for operating the runner vanes 9. Thus, the bearing retaining portion 36' also serves as the cross head.

In the embodiment shown in FIG. 1, the cross head and the propelling force receiving plate are provided at both sides of the operating rod, whereas in the embodiment shown in FIG. 2, the cross head and the propelling force receiving plate are both provided on the runner side and in particular, the bearing retaining portion serves also as the cross head. Therefore, in accordance with the latter embodiment, the number of these components is reduced to thereby further simplify the structure. In addition, although the number of the components is reduced, there is no degradation in performance and it is possible to obtain substantially the same effect and operation as those of the embodiment shown in FIG. 1.

According to the present invention, it is possible to smoothly operate the runner vanes and to provide a tubular water wheel having a runner vane operating mechanism which is superior in operationability.

I claim:

1. A tubular water wheel, comprising:
   a draft tube;
   a stationary stay ring fixably mounted to said draft tube;
   a stationary wheel inner case;
   a plurality of stay vanes rigidly mounting said wheel inner case within said stay ring;
   a main shaft having one end for mounting thereon a generator and having an opposite end;
   a runner fixedly mounted coaxially to said opposite end of said main shaft;
   a hollow main shaft portion fixedly mounted to said runner on the side opposite from and coaxial with said main shaft;
   a plurality of runner vanes mounted on said runner respectively for rotation about generally radial axes;
   linkage means connected to said runner vanes and having an input within said runner for converting a reciprocating input to rotary movement of said runner vanes for adjusting the angle of said runner vanes;
   an operating rod mounted coaxially within said hollow main shaft portion for reciprocating axial movement relative to said main shaft portion, said operating rod having a downstream axial end and an upstream axial end;
   a main shaft bearing coaxially mounted between said wheel inner case and said main shaft portion;
   a servo-motor mounted outside of said draft tube and said stay ring;
   at least one of said stay vanes being hollow;
   a lever extending through said one hollow stay vane, and said lever having one end drivingly connected to said servo-motor, a midportion rotatably connected to said vane, and an opposite end;
   said main shaft bearing including a stationary bearing support portion;
   one of the downstream end of said hollow mainshaft portion and said bearing support portion having an inner cylindrical surface;
   a bearing retainer portion having a cylindrical exterior in axial sliding engagement with said cylindrical surface coaxially with said main shaft;
   a propelling force receiving plate fixably mounted on said operating rod;
   a thrust bearing mounted between said propelling force receiving plate and said bearing retainer portion;
   link means drivingly connecting said opposite end of said lever to one of said bearing retainer portion and said operating rod and the other of said operating rod and said bearing retaining portion being drivingly connected to said linkage means input so that said servo-motor will oscillate said lever, reciprocate said bearing retaining portion, reciprocate said operating rod, and rotatably adjust the angle of said runner vanes.

2. The tubular water wheel according to claim 1, wherein said wheel inner case includes a cylindrical mounting surface coaxial with said main shaft;
   said main shaft bearing portion includes an outer cylindrical surface telescopically engaging within said wheel inner case cylindrical surface and a radial abutment surface axially engaging with said wheel inner case for axial assembly from the upstream end of said wheel inner case.

3. The tubular water wheel according to claim 2, wherein said bearing retainer portion is slidingly received within said main shaft bearing portion and said propelling force receiving plate is mounted on the upstream end of said operating rod.

4. The tubular water wheel according to claim 3, wherein said propelling force receiving plate is mounted on the downstream end of said operating rod, and said bearing retaining portion is slidably mounted within said hollow main shaft portion.

5. A tubular water wheel, comprising:
   a draft tube;
   a stationary stay ring fixably mounted to said draft tube;
   a stationary wheel inner case;
   a plurality of stay vanes rigidly mounting said wheel inner case within said stay ring;
   a main shaft having one end for mounting thereon a generator and having an opposite end;
   a runner fixedly mounted coaxially to said opposite end of said main shaft;
   a hollow main shaft portion fixedly mounted to said runner on the side opposite from and coaxial with said main shaft;
   a plurality of runner vanes mounted on said runner respectively for rotation about generally radial axes;
   linkage means connected to said runner vanes and having an input within said runner for converting a reciprocating input to rotary movement of said runner vanes for adjusting the angle of said runner vanes;
   an operating rod mounted coaxially within said hollow main shaft portion for reciprocating axial movement relative to and rotation with said main shaft portion, said operating rod having a downstream axial end and an upstream axial end;
   a main shaft bearing coaxially mounted between said wheel inner case and said main shaft portion, said main shaft bearing including an outer stationary bearing support portion having an inner cylindrical surface, and a radial bearing between said hollow main shaft portion and said bearing support portion;

a bearing retainer portion having a cylindrical exterior in axial sliding engagement with said cylindrical surface coaxially with said main shaft and upstream of said radial bearing;

a propelling force receiving plate fixably mounted on the upstream end of said operating rod;

a thrust bearing mounted between said propelling force receiving plate and said bearing retainer portion;

a servo-motor;

link means drivingly connecting said servo-motor to said bearing retainer portion, and said operating rod being drivingly connected to said linkage means input, so that said servo-motor will reciprocate said bearing retaining portion, reciprocate said operating rod and rotatably adjust the angle of said runner vanes.

6. A tubular water wheel according to claim 5, wherein said radial bearing has an outer race with a cylindrical surface engaging said cylindrical surface of said outer stationary bearing support portion; said cylindrical surface of said outer stationary bearing support portion opening freely upstream to provide uninhibited movement of said bearing retainer portion upstream of said stationary bearing support portion to facilitate assembly and disassembly.

7. The tubular water wheel according to claim 6, wherein said wheel inner case includes a cylindrical mounting surface coaxial with said shaft;

said main shaft bearing portion includes an outer cylindrical surface telescopically engaging within said wheel inner case cylindrical surface and a radial abutment surface axially engaging with said wheel inner case for axial assembly from the upstream end of said wheel inner case.

* * * * *